Nov. 25, 1930.  V. J. CHAPMAN  1,782,461
WELDING MACHINE
Filed Jan. 24, 1928
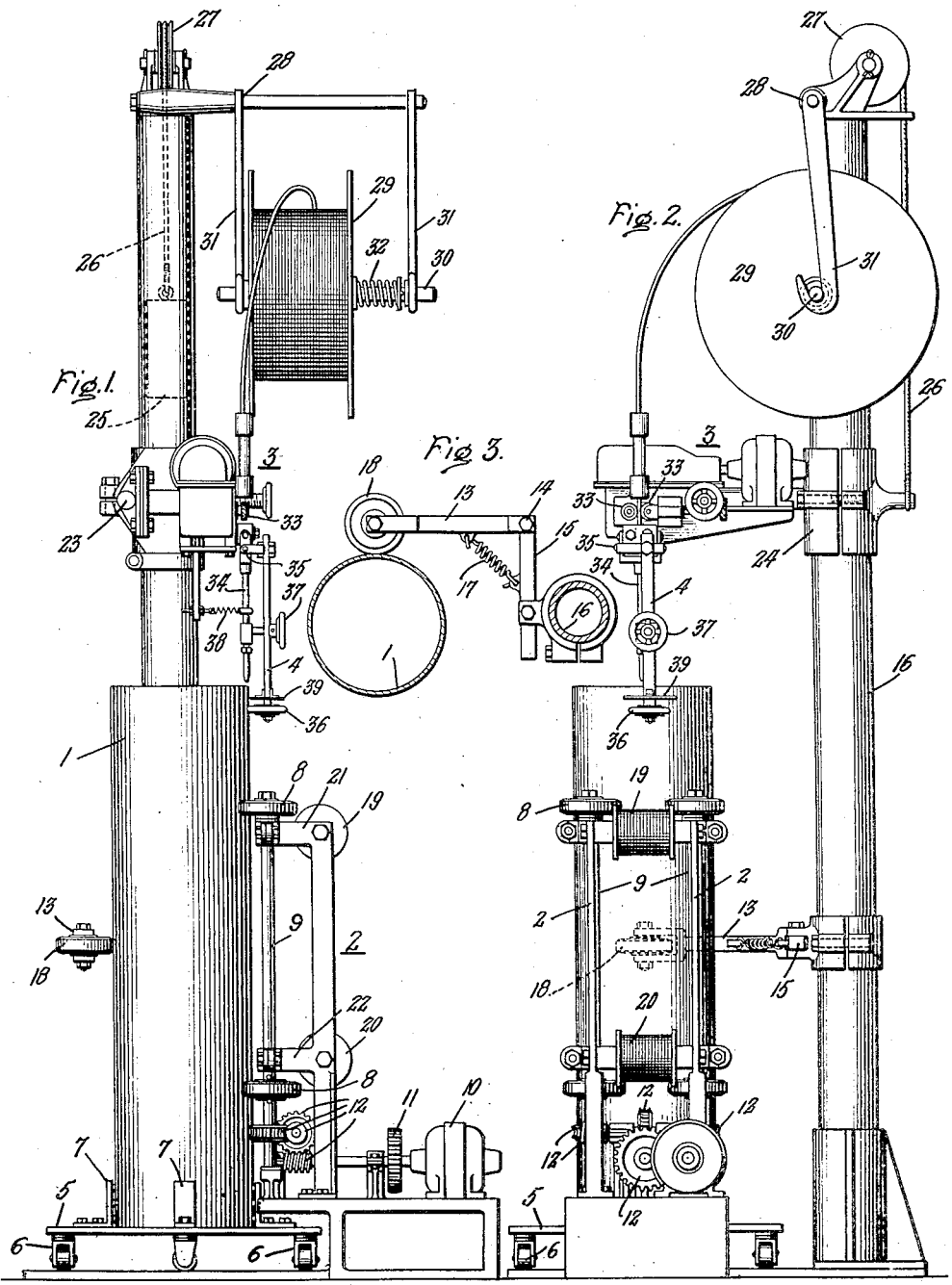
Inventor:
Verni J. Chapman,
by Charles E. Tullar
His Attorney.

Patented Nov. 25, 1930

1,782,461

UNITED STATES PATENT OFFICE

VERNI J. CHAPMAN, OF SCHENECTADY, NEW YORK, ASSIGNOR TO GENERAL ELECTRIC COMPANY, A CORPORATION OF NEW YORK

WELDING MACHINE

Application filed January 24, 1928. Serial No. 249,131.

My invention relates to welding machines and more particularly to that type of welding machine employed in welding articles such as tanks and the like.

An object of my invention is to provide an improved machine of the foregoing character with power driven means for obtaining relative movement between the welding means, which may be gas or electric, and the article being welded.

Another object of my invention is to provide an improved means for guiding the welding means with reference to the seam to be welded.

A further object of my invention is to provide a magnetic work holder which alone or in conjunction with a mechanical work holder clamps the work in proper position in the machine during the welding operation.

The novel features which I believe to be characteristic of my invention are set forth with particularity in the appended claims. The invention itself, however, both as to organization and method of operation, together with further objects and the advantages thereof will best understand by reference to the following description taken in connection with the accompanying drawing in which Figs. 1 and 2 show side views taken at right angles to one another of a machine embodying the features of my invention, and Fig. 3 is a detail plan view showing the construction of the mechanical work holder.

Referring to the drawing, a work piece 1 is shown inserted in the machine and held against a roller mechanism 2 by which it is rotated past a welding means 3 which is guided along the seam to be welded by a pilot member 4.

The work piece 1, which may be a tank into which end members are to be welded, is located on a freely movable supporting means illustrated as a table 5 mounted on casters 6. The tank may be held in position on the table 5 by dogs 7 although this will not always be necessary since the frictional engagement of the tank with the table will oftentimes be sufficient to hold it in place. Without departing from my invention the work piece or tank 1 might equally well be supported on a plurality of rollers located at the base of the machine which arrangement also constitutes a freely movable supporting means. It will likewise be apparent to those skilled in the art that under certain conditions a smooth platform may be used for supporting the work.

Means are provided for rotating the tank or work piece to produce a relative movement of traverse between the welding means 3 and the tank. As illustrated, this means comprises a vertically disposed roller mechanism 2, previously referred to, having four wheels 8 mounted on shafts 9 which are driven by a motor connected therewith through change speed gears 11 and worms and worm wheels 12. The rolls 8 of the tank roller are so arranged relative to one another in planes one above the other as to constitute an abutment against which or a cradle in which the work is located during the welding operation. The speed at which the work is moved relative to the welding means 3 may be adjusted by changing the change speed gears 11 or by adjusting the characteristics of the motor 10.

The work piece or tank as illustrated is clamped against the rolls 8 by a mechanical work holder best shown in Fig. 3. This work holder comprises an arm 13 pivotally attached at 14 to a second arm 15 suitably supported, as by clamping, to the vertical post 16 of the welding machine and is biased to a work engaging position or to an open position by a spring 17 connected to the two arms near their pivot point. The end of the arm 13 which engages the work may be provided with a roll 18 as illustrated.

Magnetic means are also provided in the machine illustrated for holding the tank 1 against the rolls 8. This means may comprise electro-magnets 19 and 20 whose yokes 21 and 22 terminate in poles located in close proximity to the work. In the illustrated embodiment the shafts 9 upon which the rolls 8 are mounted are supported in the pole terminals of the yokes and by making the rolls 8 of a magnetic material the magnetic circuit of the electro-magnets is completed through the yokes 21 and 22, rolls 8, and the portions of the work located between these rolls.

The welding means already referred to generally by the reference numeral 3 is in the illustrated embodiment of my invention shown as an automatic arc welding head which is supported on a beam 23 attached by a clamp 24 to the vertical post 16 of the welding machine. The welding head and beam are counterbalanced by a weight 25 located within the post 16 which is attached to the clamp 24 by a cable 26 which passes over a pulley 27 located at the upper end of the post 16. At the upper end of the post 16 a bracket 28 is also provided for supporting a reel of wire or rod 29 used in the welding operation. This reel is supported on a shaft 30 located in hook members 31 depending from the bracket 28 and a spring brake 32 is provided between one of the hook members and the reel 29 for preventing the reel from coasting and unwinding more rod than is demanded by the welding head during the welding operation.

The welding head illustrated comprises means for feeding the welding rod or wire toward the work shown as feed rolls 33 and means for conducting the rod from the feeding means to the work having a movably supported member 34 for guiding the terminal of the rod along the seam to be welded. The pilot member 4, previously referred to, is attached to this movable member 34 at 35 and has at its opposite end a roller 36 adapted to engage the side wall of the work in order to guide the movable element 34 along the seam to be welded. The movable element 34 may be adjusted across the seam by a hand-wheel 37 which controls the relative adjustment of movable member 34 and the pilot member 4. The movable member 34 or guide member is biased by a spring 38 in a direction such that the guide roll 36 at the terminal of the pilot member 4 is held against the side of the work. The wheel 36 is protected from the heat of the welding means and from spattered metal by a shield 39 which is interposed between it and the welding means.

The method of operation is as follows: A tank is inserted in the machine and held in place by the magnetic work holder or by the mechanical work holder or both. If the material of the tank is magnetic the mechanical work holder may be swung out of the way and the magnetic work holder used alone. On the other hand, if the tank is of a non-magnetic material the mechanical work holder will be used alone. Under certain conditions it will be found desirable to use both the work holders in conjunction. In a machine making use of an arc for the welding means it is desirable to locate the magnetic means for holding the work in a position at a suitable distance from the point of welding so that the magnetic field established will not affect the arc in an undesirable manner.

The beam 23 is then adjusted to the proper height to bring the welding means in operative relation with the work by moving the clamp 24 along the post 16. When the parts are in proper relationship the guide roll 36 of the pilot member 4 will engage the side of the work piece as illustrated and the welding means may then be adjusted across the seam by means of hand wheel 37. It may be well to point out here that instead of making a portion of the welding means freely movable as illustrated the whole structure may be made movable. In either case the pilot member will function to guide the welding means along the seam. With the work in the machine as illustrated the motor 10 and the welding means are placed in operation and the welding operation then proceeds automatically.

When welding a circular tank, such as illustrated, the welding means may be located between the rolls 8. However in welding a tank of irregular contour the welding means should be located immediately above the point of tangency of the work or tank with one of the rolls 8 so that the seam at the end of the workpiece will always be immediately under the welding means thus relieving to a great extent the duty on the pilot member 4. The terminal of the pilot member preferably engages the side of the work at right angles to the joint at the point of welding since when located in this position the welding means 34 will be caused to accurately follow any irregularities in the work such as caused by dents or corrugations. It is to be noted that if a pilot member following along the seam in advance of or behind the welding means were used, dents or corrugations in the edge of the work piece being welded would cause the welding means to be deflected from the center line of the seam. However, by my arrangement such a result is avoided since the welding means will be forced to follow the irregularities produced by dents or corrugations by reason of the pilot member engaging the side of the work piece below and substantially in line with the point of welding.

While I have disclosed a particular embodiment of my invention and certain apparatus for carrying out my method it will be obvious to those skilled in the art that various modifications may be made without departing from my invention and I therefore desire in the appended claims to cover all such modifications as fall within the true spirit and scope of my invention.

What I claim as new and desire to secure by Letters Patent of the United States is:

1. A machine for welding ends into tanks comprising a movable supporting means for the tank to be welded, a power driven roller mechanism for rotating the tank, means for clamping the tank against said roller mechanism, means for producing a weld, means for movably supporting said welding means and means attached to said movable supporting means for guiding said welding means along a seam at the end of the tank during the welding operation.

2. A machine for welding ends into tanks comprising means for producing a weld, means for producing a relative movement of traverse between said welding means and the tank, means for movably supporting said welding means, means extending beyond said welding means for engaging the outside surface of the tank at a point laterally disposed from the point of welding attached to said welding means for guiding the welding means along a seam at the end of the tank, and means for biasing said work engaging means into engagement with the tank.

3. A welding machine wherein a metallic rod is fused and incorporated in the work comprising means for feeding said rod toward the work, means for conducting the rod from the feeding means to the work having a pivotally supported member for guiding the terminal of the rod along the seam to be welded, a second member pivotally attached to said guiding member and terminating in in a work engaging element extending beyond the end of said guiding member, means for adjusting the separation of said members near their free ends and means for biasing said guide member in a direction such that the work engaging element of said second member is held against the side of the work at a point beyond the seam being welded.

4. A machine for welding members with their surfaces angularly disposed relative to one another, comprising means for producing a weld, means for producing a relative movement of traverse between said welding means and said members, means for movably supporting said welding means, an offset extension member attached to said supporting means, a work engaging roll attached to said extension member for engaging the surface of one of said members at a point laterally displaced from the joint, means for biasing said roll into engagement with the work, and a shield for said roll interposed between said roll and the welding means.

5. A welding machine comprising a freely movable work supporting means, a vertically disposed power driven work engaging roller mechanism for rotating the work and means for clamping the work against said roller mechanism.

6. A welding machine comprising a work supporting table mounted on rollers, means for clamping the work piece to said table, a vertically disposed power driven work engaging roller mechanism for rotating the work and means for clamping the work against said roller mechanism.

7. A welding machine comprising a vertically disposed roller mechanism including a plurality of work engaging rolls located in planes one above the other so arranged relative to one another as to constitute a cradle in which the work may be located, electromagnetic means for holding the work against said rolls and welding mechanism located above the points of contact of the work with said rolls.

8. A roller mechanism for a welding machine comprising a plurality of rolls arranged one above the other so as to provide a vertical abutment, means for holding the work against said rolls and means for rotating at least one of said rolls.

9. A work holder comprising a plurality of rolls constituting an abutment, a hinged arm for clamping the work against said abutment, means including a spring for biasing said arm to a work engaging position and for biasing said arm to a position clear of the work, and means for rotating at least one of said rolls of said abutment.

In witness whereof, I have hereunto set my hand this 23rd day of January 1928.

VERNI J. CHAPMAN.

CERTIFICATE OF CORRECTION.

Patent No. 1,782,461.  Granted November 25, 1930, to

VERNI J. CHAPMAN.

It is hereby certified that error appears in the printed specification of the above numbered patent requiring correction as follows: Page 1, line 26, strike out the word "understand" and insert the words be understood; same page, line 66, after "motor" insert the numeral 10; page 3, line 28, claim 3, strike out the word "in"; and that the said Letters Patent should be read with these corrections therein that the same may conform to the record of the case in the Patent Office.

Signed and sealed this 6th day of January, A. D. 1931.

(Seal)

M. J. Moore,
Acting Commissioner of Patents.